(12) United States Patent
Meineke et al.

(10) Patent No.: US 7,066,501 B2
(45) Date of Patent: Jun. 27, 2006

(54) AIRCRAFT LATCH

(75) Inventors: William Steve Meineke, Riverside, CA (US); Carolyn L. Wilkerson, Orange, CA (US); Braskel Elmer Phillips, III, Covina, CA (US)

(73) Assignee: Avibank Mfg., Inc., North Hollywood, CA (US)

( * ) Notice: Subject to any disclaimer, the term of this patent is extended or adjusted under 35 U.S.C. 154(b) by 10 days.

(21) Appl. No.: 10/947,819

(22) Filed: Sep. 22, 2004

(65) Prior Publication Data

US 2006/0061108 A1 Mar. 23, 2006

(51) Int. Cl.
*E05C 5/00* (2006.01)

(52) U.S. Cl. .................. 292/110; 292/247; 292/113; 244/129.4

(58) Field of Classification Search .............. 292/110, 292/113, 109, 246, DIG. 31; 244/129.4
See application file for complete search history.

(56) References Cited

U.S. PATENT DOCUMENTS

| | | | | |
|---|---|---|---|---|
| 2,712,955 A | * | 7/1955 | Andrews | 292/113 |
| 2,904,141 A | * | 9/1959 | Henrichs | 403/321 |
| 4,053,177 A | * | 10/1977 | Stammreich et al. | 292/113 |
| 4,183,564 A | * | 1/1980 | Poe | 292/113 |
| 4,318,557 A | * | 3/1982 | Bourne et al. | 292/113 |
| 4,602,812 A | * | 7/1986 | Bourne | 292/113 |
| 4,743,052 A | * | 5/1988 | Stammreich et al. | 292/113 |
| 4,768,815 A | * | 9/1988 | Harmon | 292/113 |
| 5,620,212 A | * | 4/1997 | Bourne et al. | 292/113 |
| 5,915,765 A | * | 6/1999 | Sternberger | 292/256.69 |
| 5,984,382 A | * | 11/1999 | Bourne et al. | 292/113 |
| 6,279,971 B1 | * | 8/2001 | Dessenberger, Jr. | 292/113 |

* cited by examiner

*Primary Examiner*—Brian E. Glessner
*Assistant Examiner*—Mark Williams
(74) *Attorney, Agent, or Firm*—Greenberg Traurig, LLP; Louis J. Bovasso, Esq.

(57) ABSTRACT

An aircraft latch is disclosed for latching to the preexisting latch pin of an aircraft assembly. The latch includes a trigger safety to block the trigger from accidentally being opened. A link trunion adds rigidity to the system and cooperates with the trigger safety to provide an anti-vibrating feature. A detent on the latch cooperates with the installation housing in which the latch pin is mounted to hold the latch handle in place when the latch is fully opened to prevent the aircraft doors in which the latch is mounted from being closed inadvertently while the latch is still unlatched.

18 Claims, 13 Drawing Sheets

AIRCRAFT LATCH

BACKGROUND OF THE INVENTION

The invention relates to latches; and more particularly, to aircraft latches.

RELATED ART

Latches are used on the exterior surfaces of aircraft where it is important that the latch present a flush surface with the aircraft body and indicate when the latch is in a locked or unlocked position.

Such latches normally cooperate with a keeper or locking pin on an opposing surface for engaging the latch. It is important that such latches be securely and tightly latched especially when subjected to high vibrations and rattling.

The trigger of such latches is normally exposed and unprotected. It can be hit accidentally during maintenance or the like thus unlocking the latch when such is undesirable. Further, such latches must be securely latched in a positive manner. Unless some provision is made to positively lock the latch, the aircraft cowl may come down and close in a situation where the latch has not been completely locked.

There is a need for a latch that cannot be opened accidentally during service or the like. Such a latch should have such a safety feature with anti-vibrating means and means for mounting the same to a preexisting housing which can be modified to accommodate the latch. The operator should not be able to close the aircraft cowl in which the latch is associated unless the latches fully latched.

SUMMARY OF THE INVENTION

It is an object of this invention to provide an aircraft latch which cannot be opened accidentally during service or the like.

It is another object of this invention to provide a latch which can be easily mounted to a preexisting aircraft housing in a rigid manner.

It is still another object of this invention to provide a spring braced trigger lock with anti-vibrating means.

It is a further object to provide a detent in the latch that engages with the preexisting housing to hold the latch handle in place when the latch is fully open.

These and other objects are preferably accomplished by providing a latch that includes a trigger safety to block the trigger from accidentally being opened. A link trunion adds rigidity to the system and cooperates with the trigger safety to provide an anti-vibration feature. A detent on the latch cooperates with the installation housing in which the latch pin is mounted to hold the latch handle in place when the latch is fully opened to prevent the aircraft doors in which the latch opened from being closed inadvertently while the latch is still unlatched.

DESCRIPTION OF THE PREFERRED EMBODIMENTS

Figure 1:
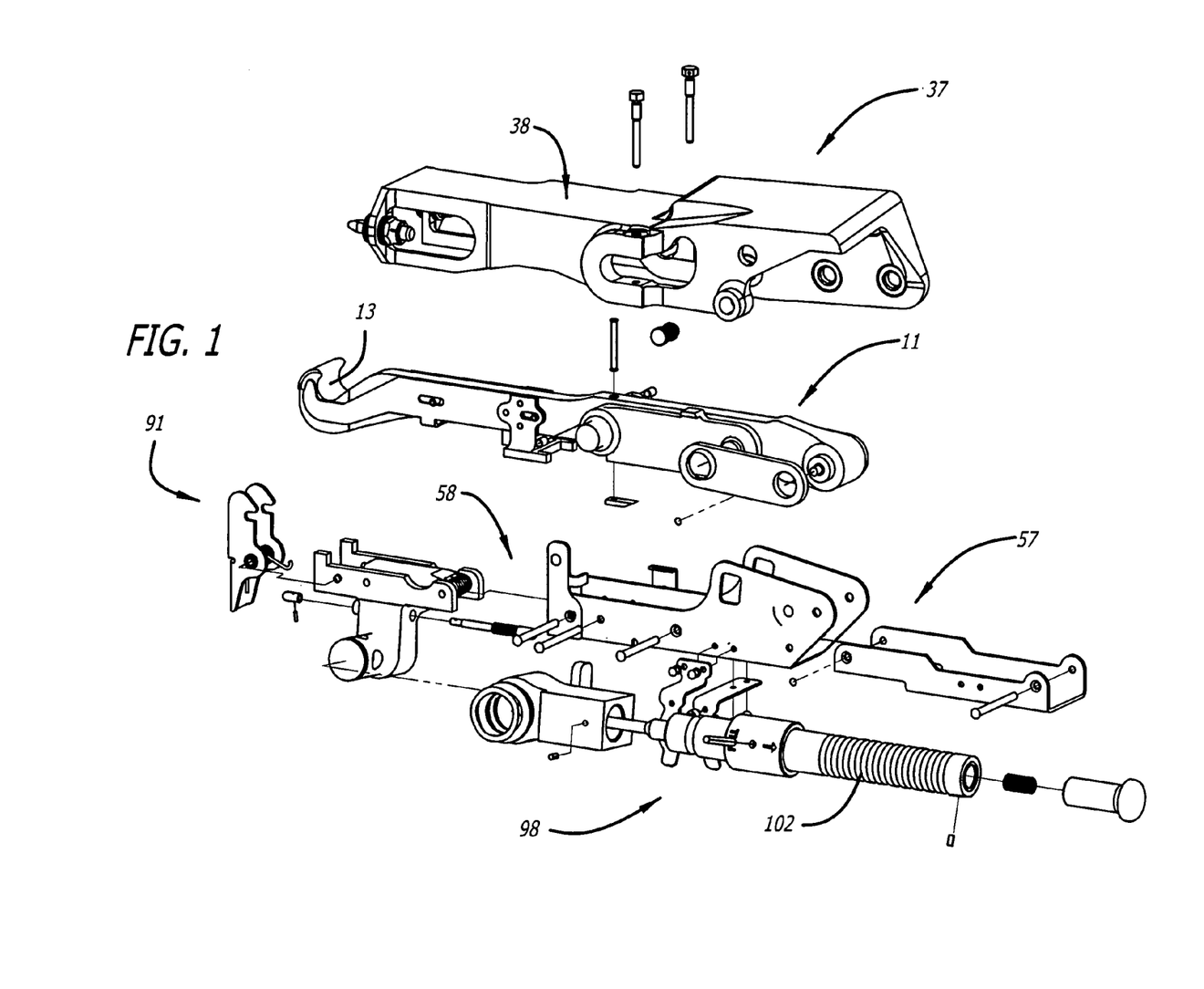
FIG. 1 is an exploded view of the latch and housing of the invention.
Figure 9:
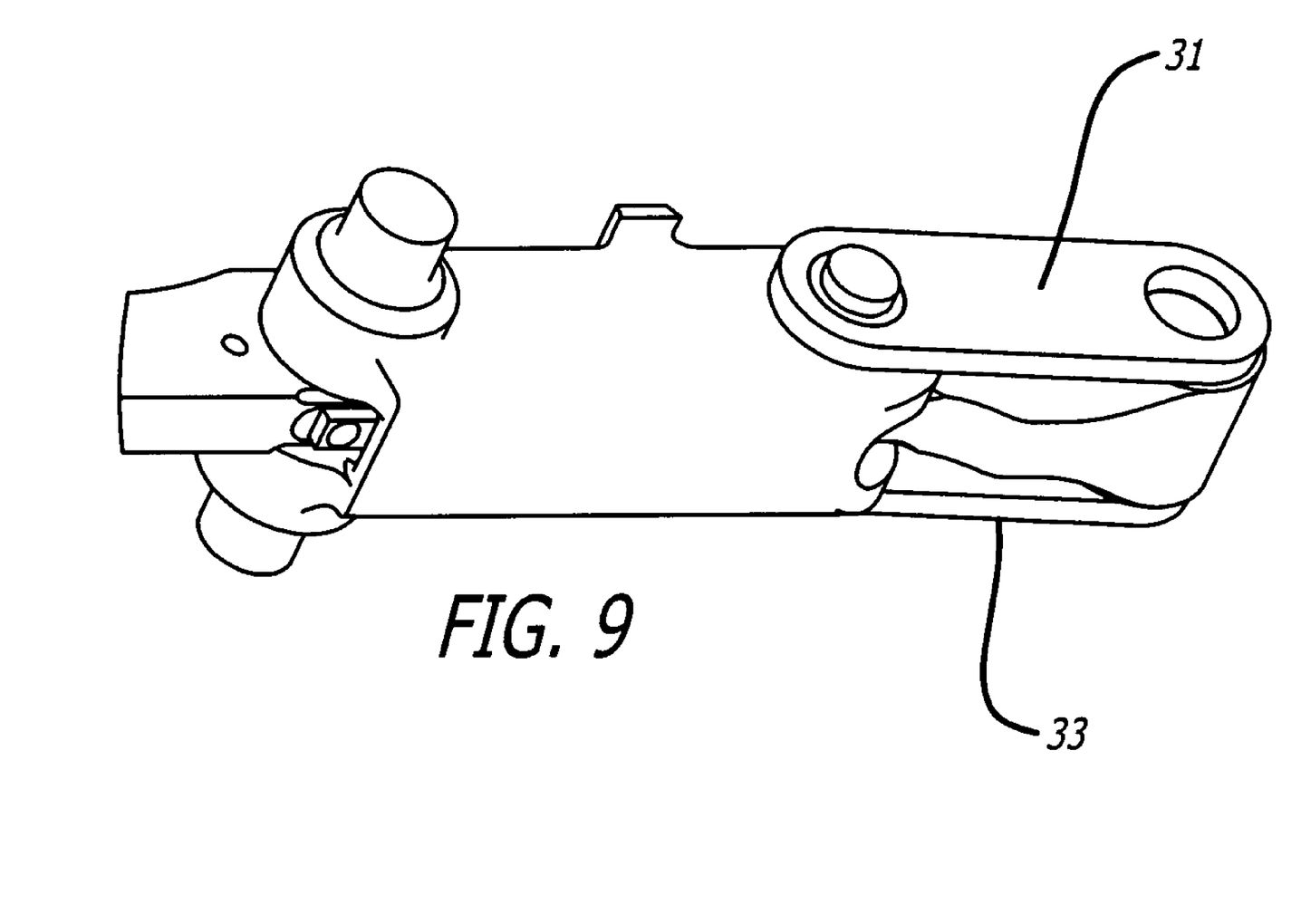
FIG. 9 is a detailed view of a portion of the latch of FIG. 2 illustrating the links thereof.

Referring now to FIG. 1 of the drawing, latch 10 is shown in exploded view. Latch 10 includes a hook assembly 11 having a main body portion 12 (FIG. 1B) terminating at one end in a hook 13. Main body portion 12 has a slot 14 therein with a pin 15 slidably mounted therein and retained therein in any suitable manner. A spring biased hook sensor 16 is associated with body portion 12 disposed between hook 13 and a sensor stop 17. Hook sensor 16 reciprocates on body portion 12, allowing pin 15 to move in slot 14 and pin 19 (FIG. 11) to move in slot 23. Hook sensor 16 terminates with a hook sensor portion 16' (FIG. 5) extending into hook 13 for sensing the engagement of pin 40 (FIG. 2) therewith. Sensor stop 17 (FIG. 1B) is a U-shaped member having upstanding portions 18, 19 secured to main body portion 12 by a plurality of spaced countersunk set screws 20. The main body portion 12 has a trigger stop rivet 22 (FIG. 11) mounted therein. Slot 23 (FIG. 1B) provided in portion 18 has a pin stop 24 slidably mounted therein and retained therein in any suitable manner. A trunion plate 25 is mounted to main body portion 12 having a shoulder 26 at its upper end and an outwardly protruding cylindrical boss 27 on one side thereof. A second cylindrical boss 28 extends from plate 25 through a hole 30 in a back link 31. Link 31 has a second cylindrical hole 32 therethrough. A similar back link 33 is provided on the other side of main body portion 12 secured thereto in like manner (see also FIG. 9).

Referring again to FIG. 1B, main body portion 12 has a rounded enlarged end 34 with a cylindrical bushing 35 protruding therefrom receivable in hole 32. A smaller diameter pin 36 extends from bushing 35 to connect the same to trigger assembly 57 (FIG. 1) as will be discussed.

Figure 1A:
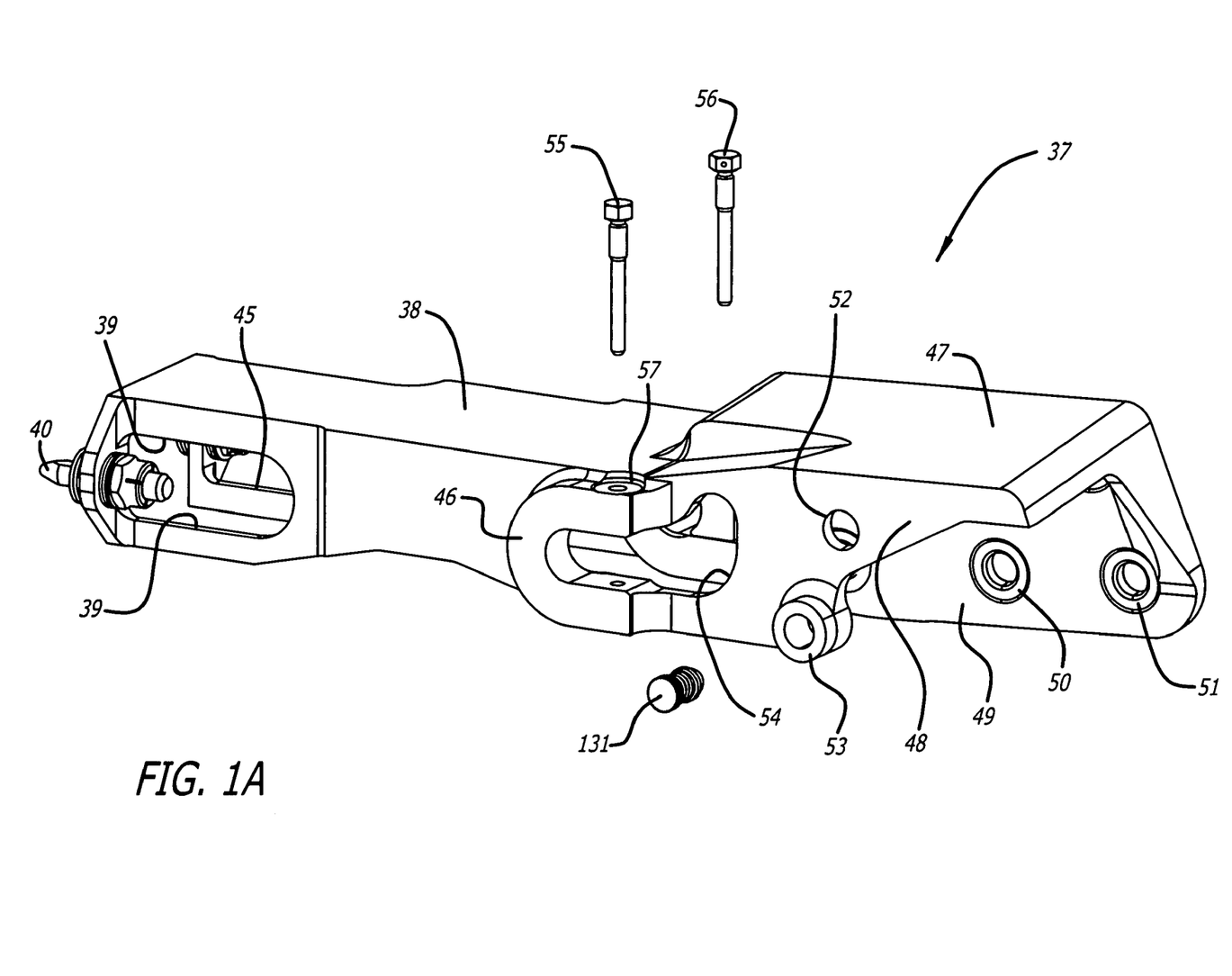
FIG. 1A through 1D are perspective views of individual parts of the latch of FIG. 1.

Hook assembly 11 is adapted to engage a housing assembly 37 (FIG. 1A) having a main body portion 38 with a pair of generally rectangular elongated openings 39, 45 at the forward end thereof on each side thereof. A forwardly extending latch pin 40 (see also FIG. 2) is secured to the forward end face 41 (FIG. 5) of main body portion 38 in any suitable manner, such as having a threaded portion 42 threadably received in lock nuts 43, 44 mounted on opposite sides of face 41.

Main body portion 38 (FIG. 1A) has a U-shaped boss 46 on the outside thereof (and a like boss 46' on the opposite inner wall thereof—see FIG. 10)). Referring again to FIG. 1A, main body portion 38 is enlarged at its rear end portion 47 terminating in an open end 48 defined by an inner portion 49 having a pair of spaced holes 50, 51 therethrough (see also FIG. 5 for a second pair of holes 50', 51' provided above holes 50, 51, hole 50' being shown in dotted lines).

Referring again to FIG. 1A, body portion 38 also has a hole 52 and an outwardly extending boss 53. The area 54 of main body portion 38 encircled by boss 46 is cut-out as shown for reasons to be discussed. A pair of headed pins 55, 56 are provided receivable in holes 57' (only one visible in FIG. 1) extending through the spaced legs of bosses 46 and 46'.

A lower trigger assembly 57 (FIG. 1C) is provided having a main body portion 58. Trigger assembly 57 has a pair of upstanding spaced plates 59, 60 at the rear end thereof each having a generally rectangular shaped hole 61, 62, respectively, therethrough.

Figure 7:
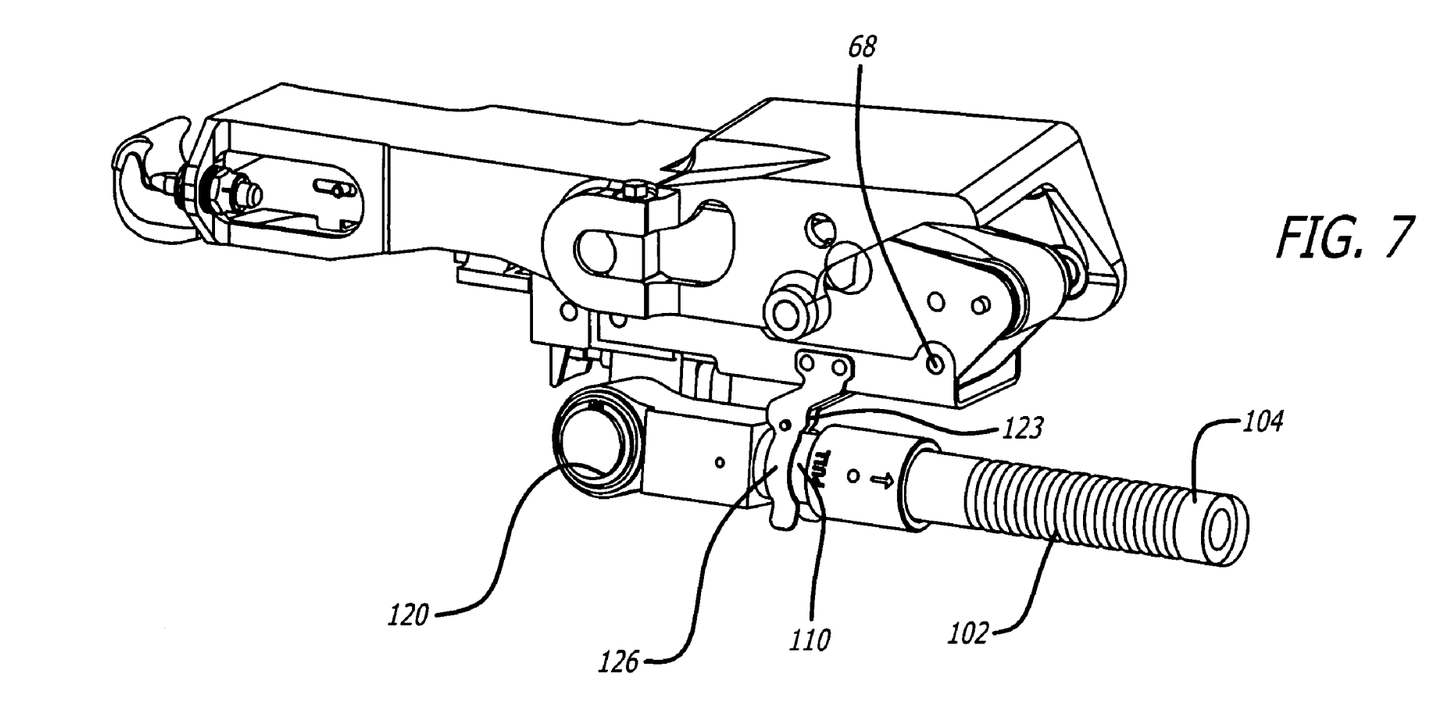
FIG. 7 is a view similar to FIG. 2 showing the anti-vibration clips in detail.

A doubler assembly 63 is provided having a pair of spaced forwardly extending extension portions 64, 65 mounted on opposite sides of plates 59, 60 by providing suitable holes 66 in plates 59, 60 mating with like holes 67 in doubler assembly 63 and retained therein by suitable rivets 68 as is well known in the art (see also FIG. 7).

Referring again to FIG. 1C, a side plate 69 is mounted to the forward ends 70, 71 of plates 59, 60, respectively, by suitable rivets 72. Side plate 69 has an inwardly extending flange 74 secured thereto. A flange 73 is secured to end 71 and has an upper end extending over end 71 as shown.

Figure 8:
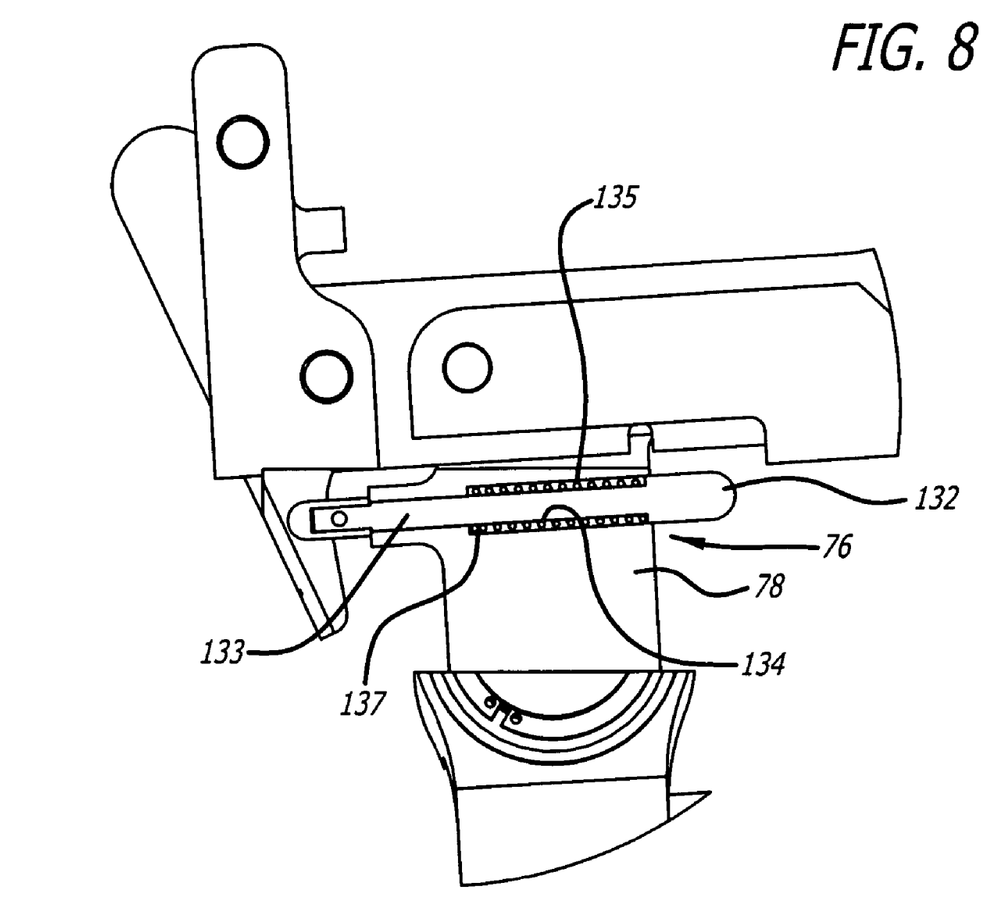
FIG. 8 is a detailed view of a portion of the latch of FIG. 2 illustrating the inner mechanism of the spring braced pen 76.

A spring biased stay out pin 76 is mounted in a hole 77 in an offset handle fitting 78 mounted to the underside of a spring cover plate assembly 79. Pin 76 (FIG. 8) has an enlarged head 132 with a smaller diameter shaft portion 133 reciprocal in an opening 134 in handle fitting 78. A spring 135 encircles shaft portion 133 between shoulder 136 and the end wall 137 of opening 134 as shown.

Figure 12:
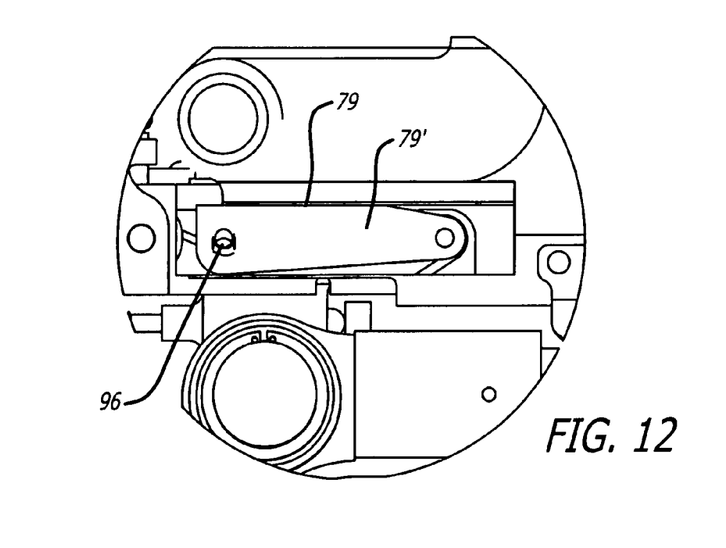
FIG. 12 is a detailed view of a portion of the latch of FIG. 11 showing the cover plate assembly, a portion of the latch being removed for purposes of illustration.
Figure 13:
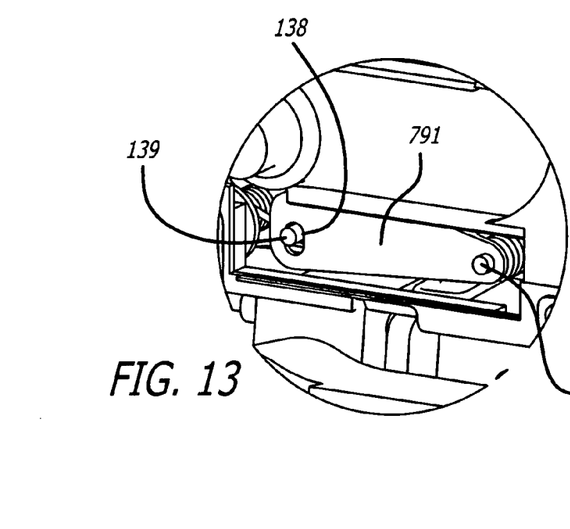
FIG. 13 is a view similar to FIG. 12 showing the cover plate spring assembly in detail.

As seen in FIG. 13, plate 79 has downwardly depending side walls 79' (only one visible in FIG. 13) having an opening 138 receiving pin 139 therethrough. Plate 79 pivots about rivet 90 with spring 89 encircling the same. End 96 (FIG. 12) of spring 95 (FIG. 1C) extends under pin 139 (see also FIG. 13). The shape of opening 138 enables the plate 79 to pivot slightly with respect thereto. Fitting 78 (FIG. 1C) has an outwardly protruding handle or knob 80 with an opening 81 through the sides thereof.

Plate assembly 79 has a pair of upstanding side portions 83, 84 each terminating at their forward ends in upstanding protrusions 85, 86, respectively. The rear end of plate assembly 79 terminates in a pair of rounded ends 87, 88, respectively, having a torsion spring 89 mounted therebetween and retained in position by a suitable rivet 90.

Figure 10:
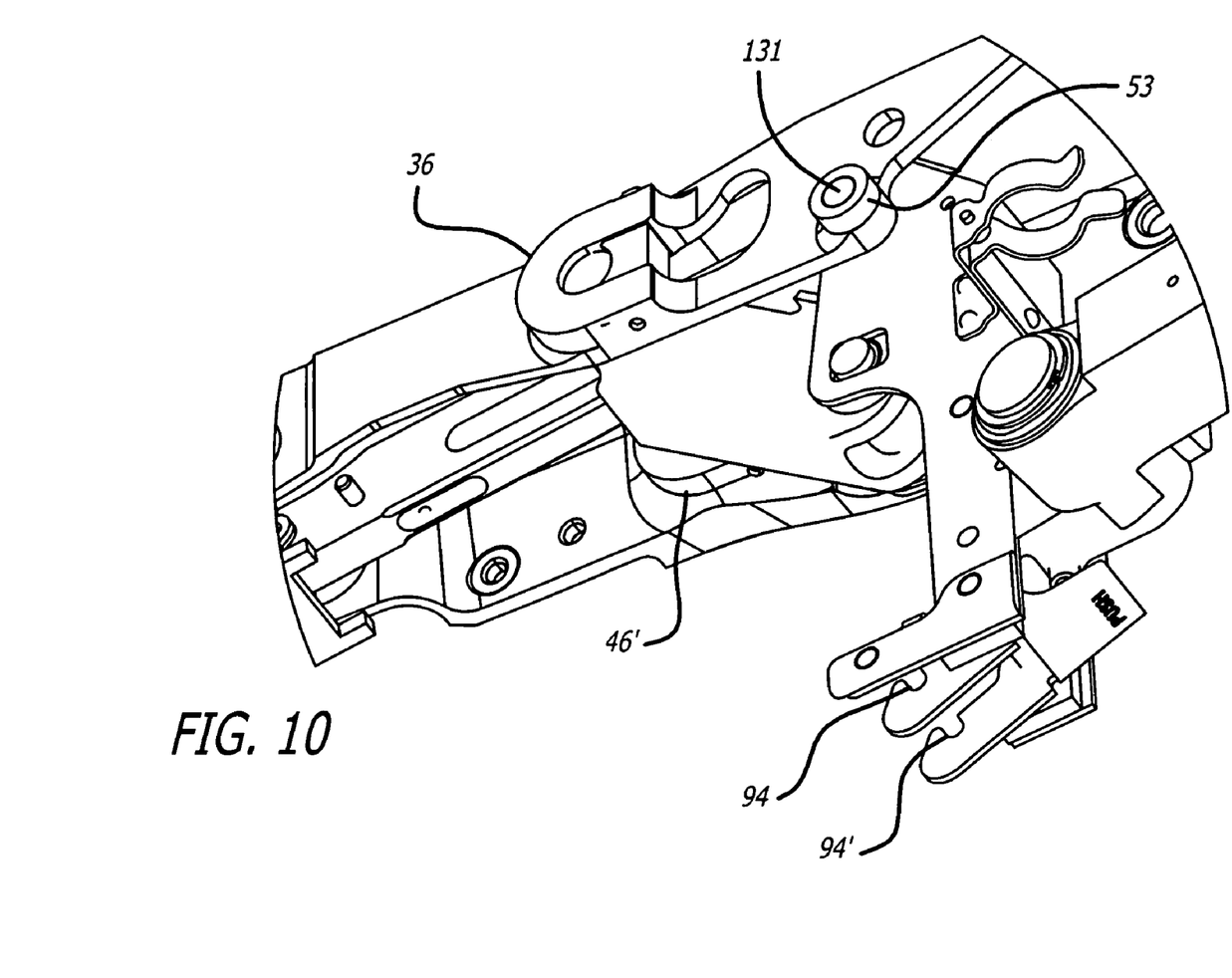
FIG. 10 is a detailed view of a portion of the latch of FIG. 2 showing its relationship to the housing when the latch is in an open position.

Trigger 91 includes a pair of spaced flanges 92, 93 receiving the ends 85, 86 of plate assembly 79 therebetween (see also FIG. 10). Each flange 92, 93 (FIG. 1C) has a notch 94, 94' (see also FIG. 10) facing plate assembly 79 with torsion spring 95 (FIG. 1C) having spring portion 96 also extending toward plate 79 secured thereon by a suitable rivet 97.

A trigger release assembly 98 (FIG. 1) is provided having an end cap 99 (FIG. 1D) receiving in an opening therein a compression spring 100. Cap 99 closes off the end 101 of a threaded secondary handle portion 102 with spring 100 receivable in a hole 103 in handle portion 102. A groove pin 104 (see FIG. 7) secures cap 99 to handle portion 102.

Referring again to FIG. 1D, handle portion 102 extends into a spring biased cylindrical release sleeve 105 and is reciprocally mounted thereon. Sleeve 105 may have suitable indicia 106 thereon for indicating the direction in which to pull sleeve 105 (see also indicia 107). A groove pin 108 extends through hole 109 in sleeve 105 movable in a groove (not shown) in handle portion 102 so that sleeve 105 can reciprocate with respect to handle portion 102.

Handle portion 102 has forwardly extending generally cylindrical stepped portions 110 to 112 of reduced diameters as shown, terminating in an elongated cylindrical spindle portion 113. Portions 110 to 113 are receivable in an opening 114 through offset handle portion 115.

A handle washer 117 is provided encircling an opening 117' through the forwarded rounded end 116 of handle portion 117 adapted to receive offset handle fitting 80 (see FIGS. 1 and 1C) therethrough. A wave washer 119 (FIG. 1D) is provided on top of washer 117 and a retaining ring 120 (see FIG. 7) fitting into a groove 121 on fitting 80 (FIG. 1C) retains the washers in place and the fitting 80 in opening 117'.

An upwardly extending flange portion 122 (FIG. 1D) is provided on one side of handle portion 117 for reasons to be discussed.

Figure 1B:
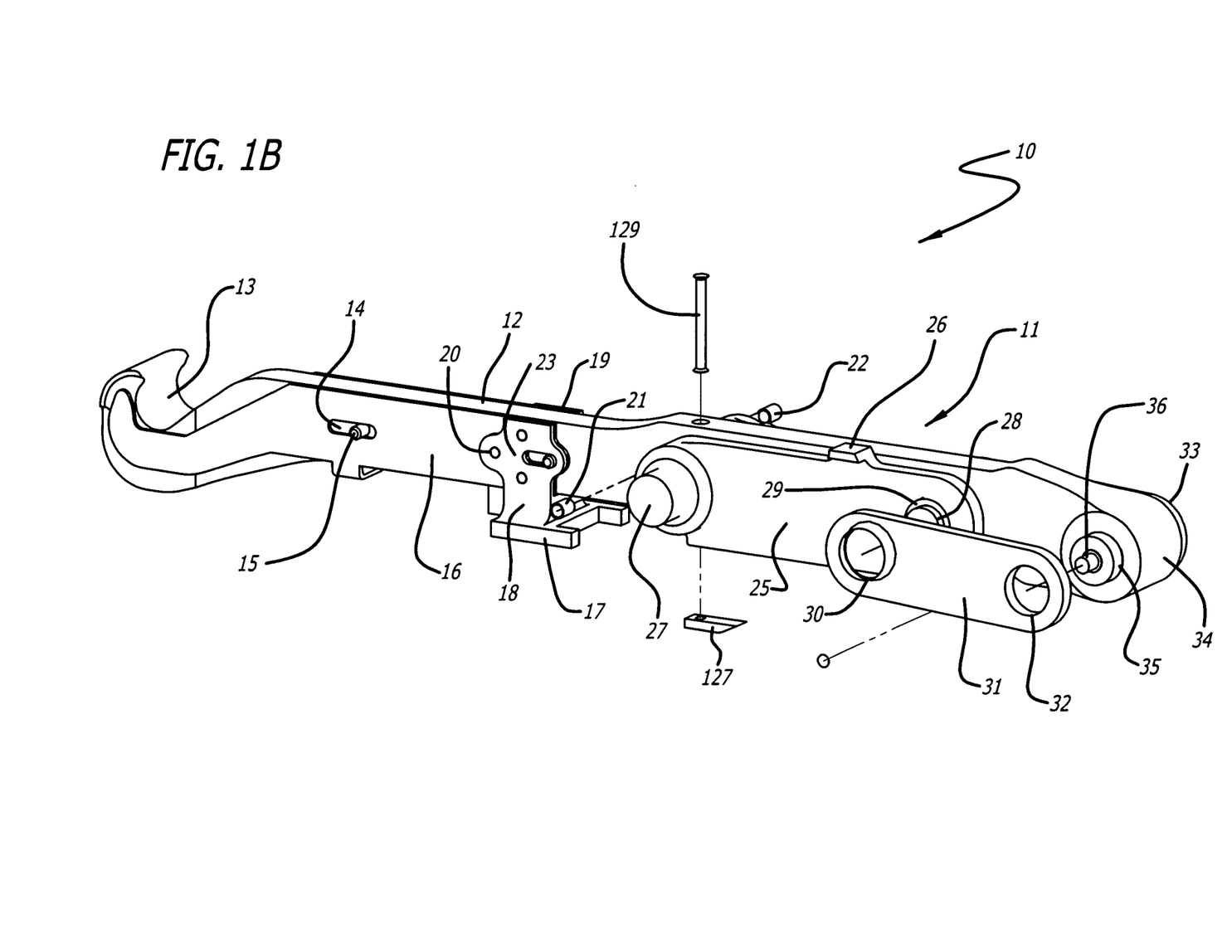
Figure 1C:
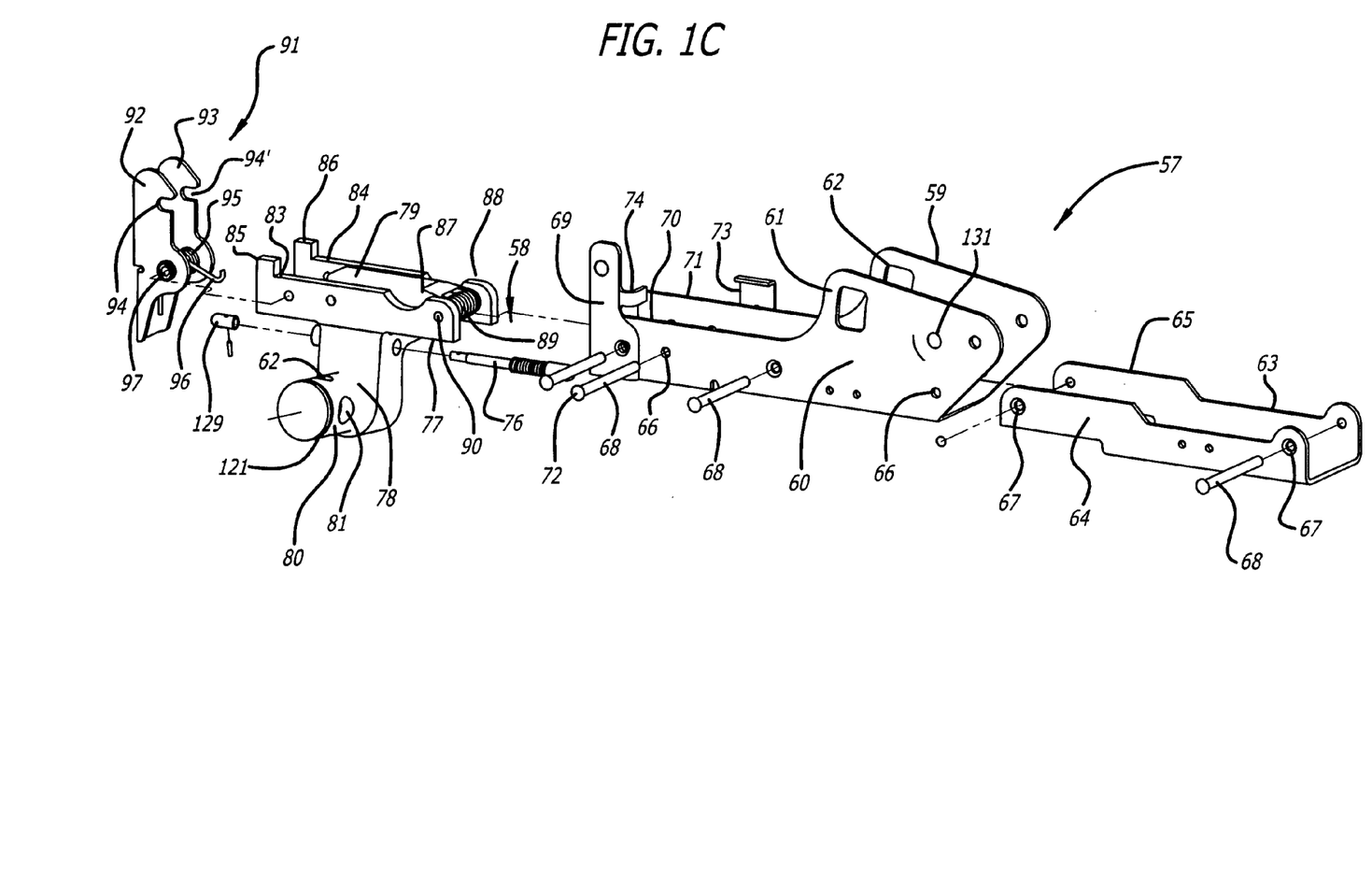
Figure 1D:
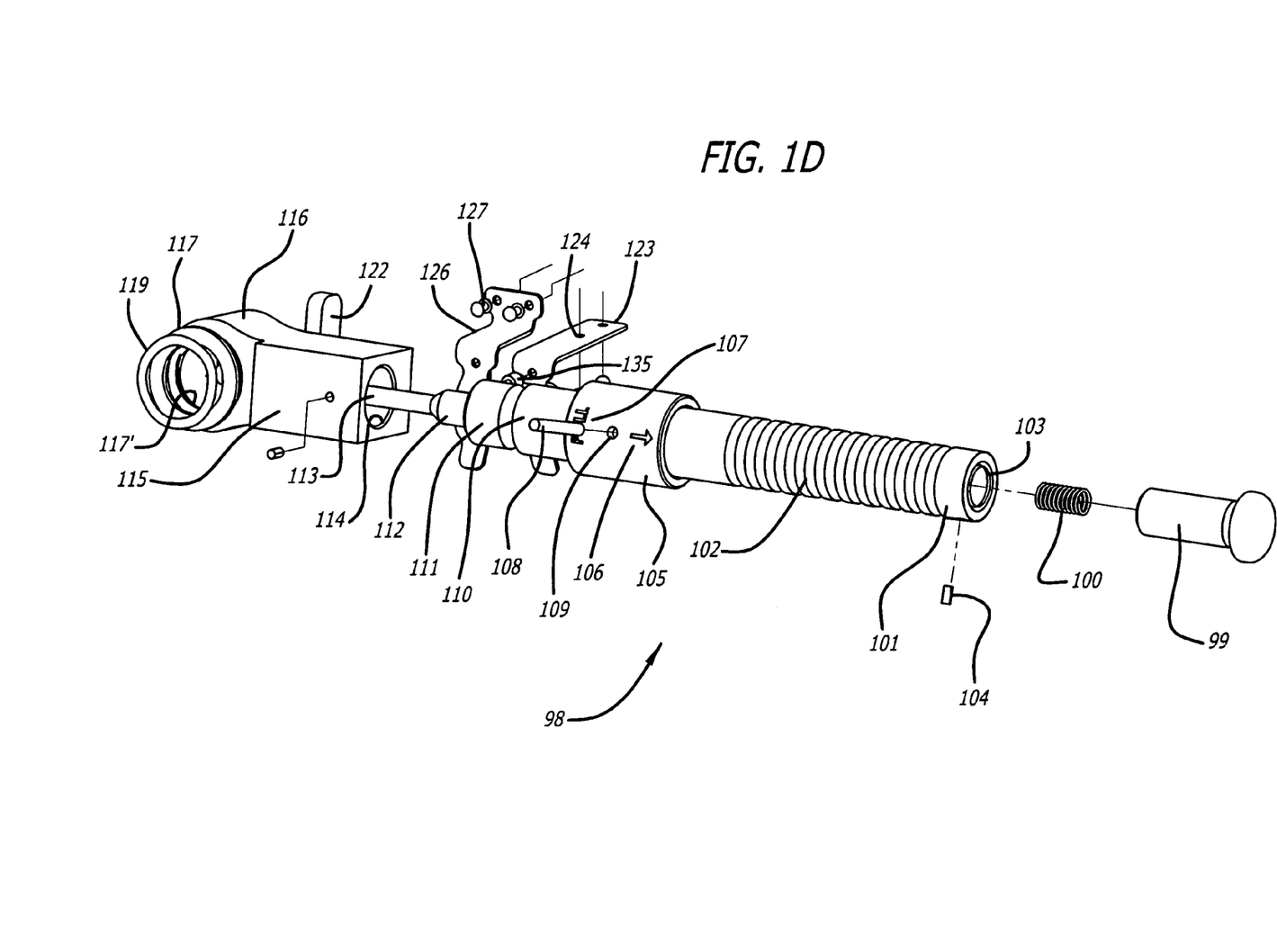

A safety clip 123 is secured to the underside and side wall 64 (FIG. 1C) of doubler assembly 63 by suitable rivets 127 (FIG. 1D) and holes 124. A second safety clip 126 is in turn secured to the underside of doubler assembly 63 (FIG. 1C) by suitable rivets 127 (FIG. 1D). These clips 123, 126 have curved bottom portions adapted to encircle the cylindrical portion 110 of handle 102 as seen in FIG. 7. As seen in FIG. 1B, a shim 127 may be mounted to the underside of main body portion 12 retained therein by a rivet 129 extending through hole 128. An end cap 129 (FIG. 1C) closes off the end of the spring biased pin 76.

Figures 2, 3:
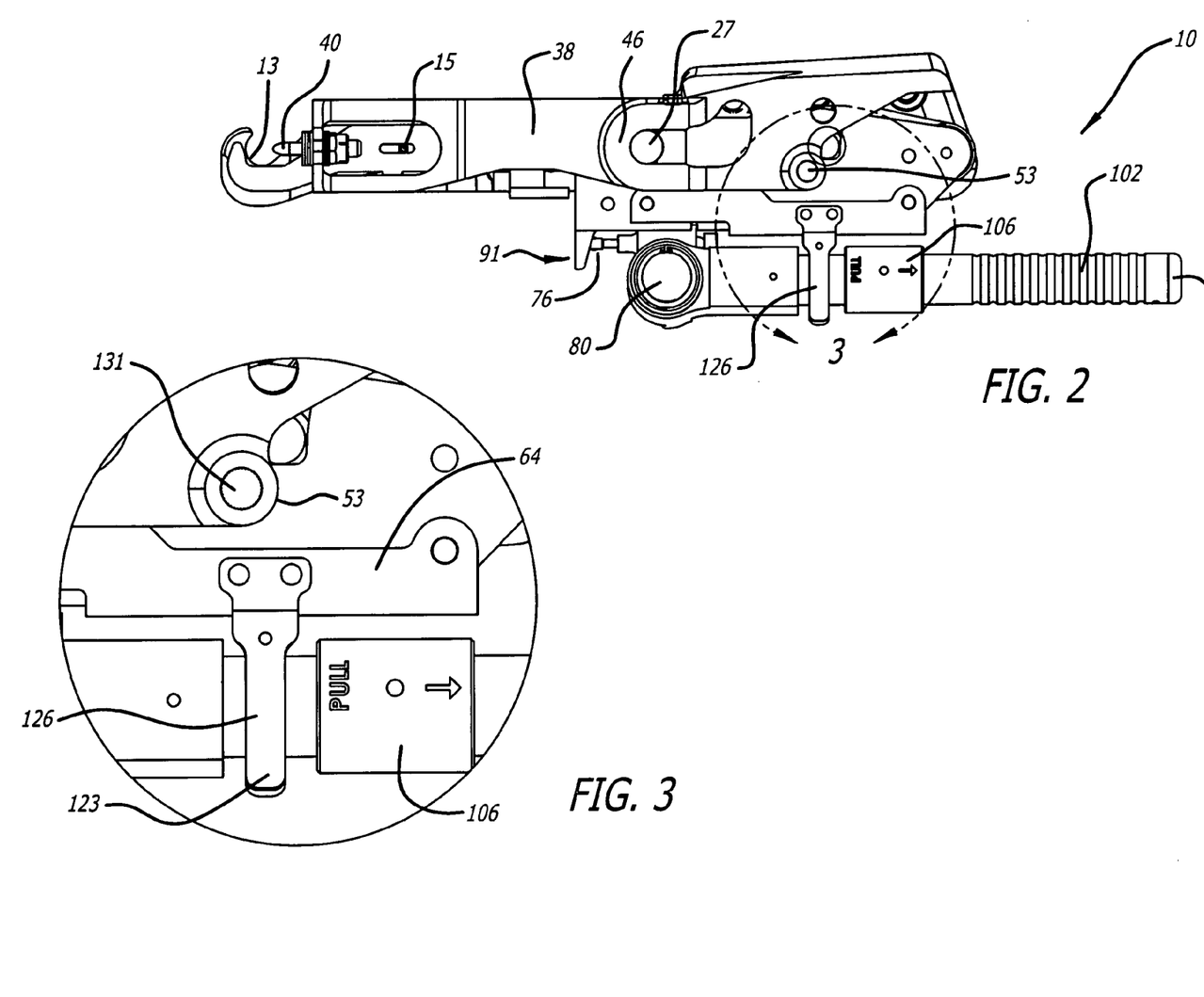
FIG. 2. is an assembled view of the latch of FIG. 1 mounted to the housing.
FIG. 3 is a detailed view of the circled portion of FIG. 2.

The assembled latch 10 is shown in FIG. 2.

Figure 11:
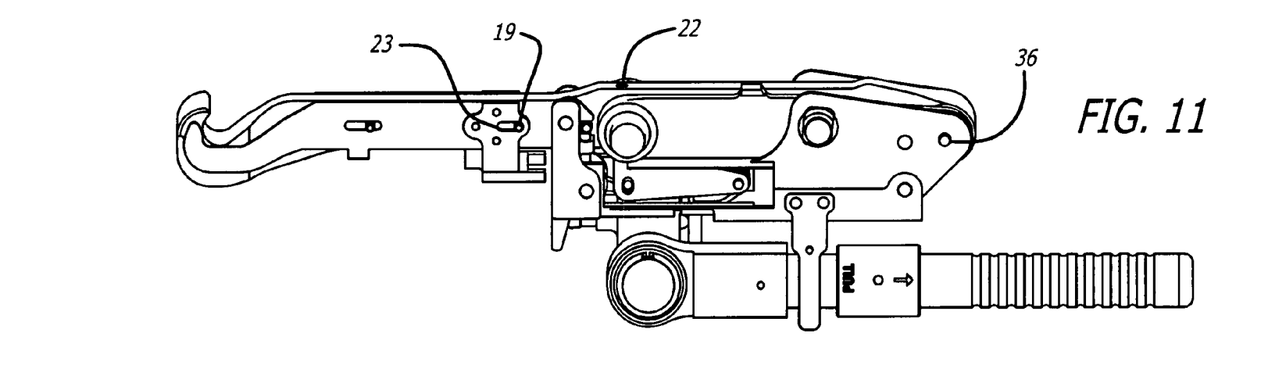
FIG. 11 is an elevational view of the latch alone showing the engagement of the trigger with the latching pin.

FIG. 2 shows the fully closed position of latch 10. The latch 10 may be mounted within housing assembly 37 as shown. Such assembly 37 may be provided by the customer but modified, as will be discussed, to accommodate latch 10. In this position, pin 76 abuts against trigger 91 preventing release of the same from detent pin 22 (FIG. 11).

Figure 4:
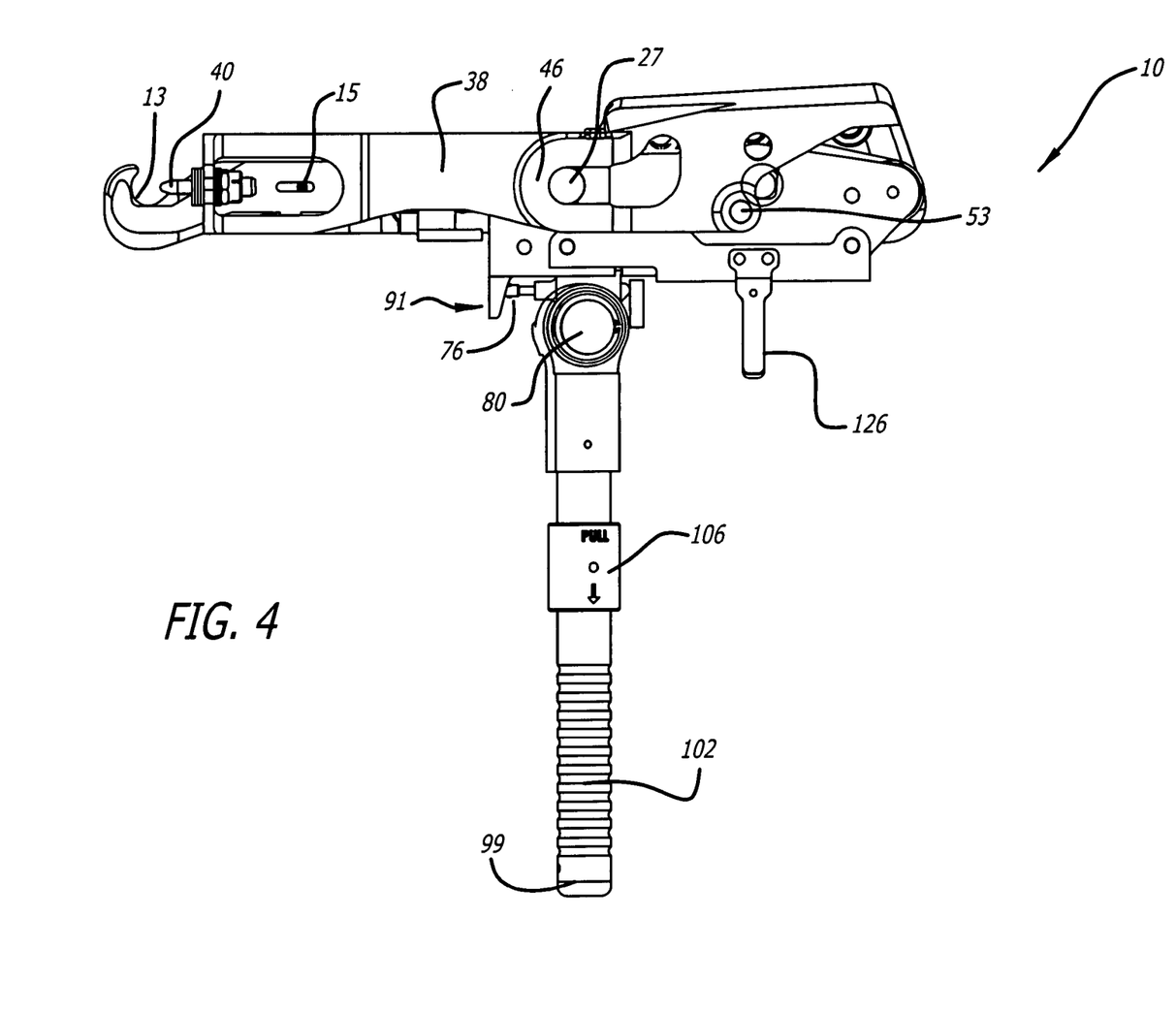
FIG. 4 shows the latch of FIG. 2 in the first open position.

Handle portion 102 is released from clips 123, 126 by pulling back on sleeve 105 (FIG. 3), against its spring bias, and moving it down to the FIG. 4 position. Clips 123, 126 provide an anti-vibrating feature to the latch 10 when in the FIG. 2 position. This also releases spring braced pin 76 which moves rearwardly from its normal position abutting against trigger 91. As seen in FIG. 4, when sleeve 106 moves back against the direction of indicia arrow 106, it locks the same so it cannot pivot on knob 80.

Since pin 76 is released from engagement with trigger 91, trigger 91 can be pushed to release the same from engagement with aforementioned detent pin 22. The trigger arm 17 and housing 37 is now in the FIG. 5 position. Boss 27 snaps into the opening 54 in housing 37 as seen in FIG. 2.

Figures 5, 6:
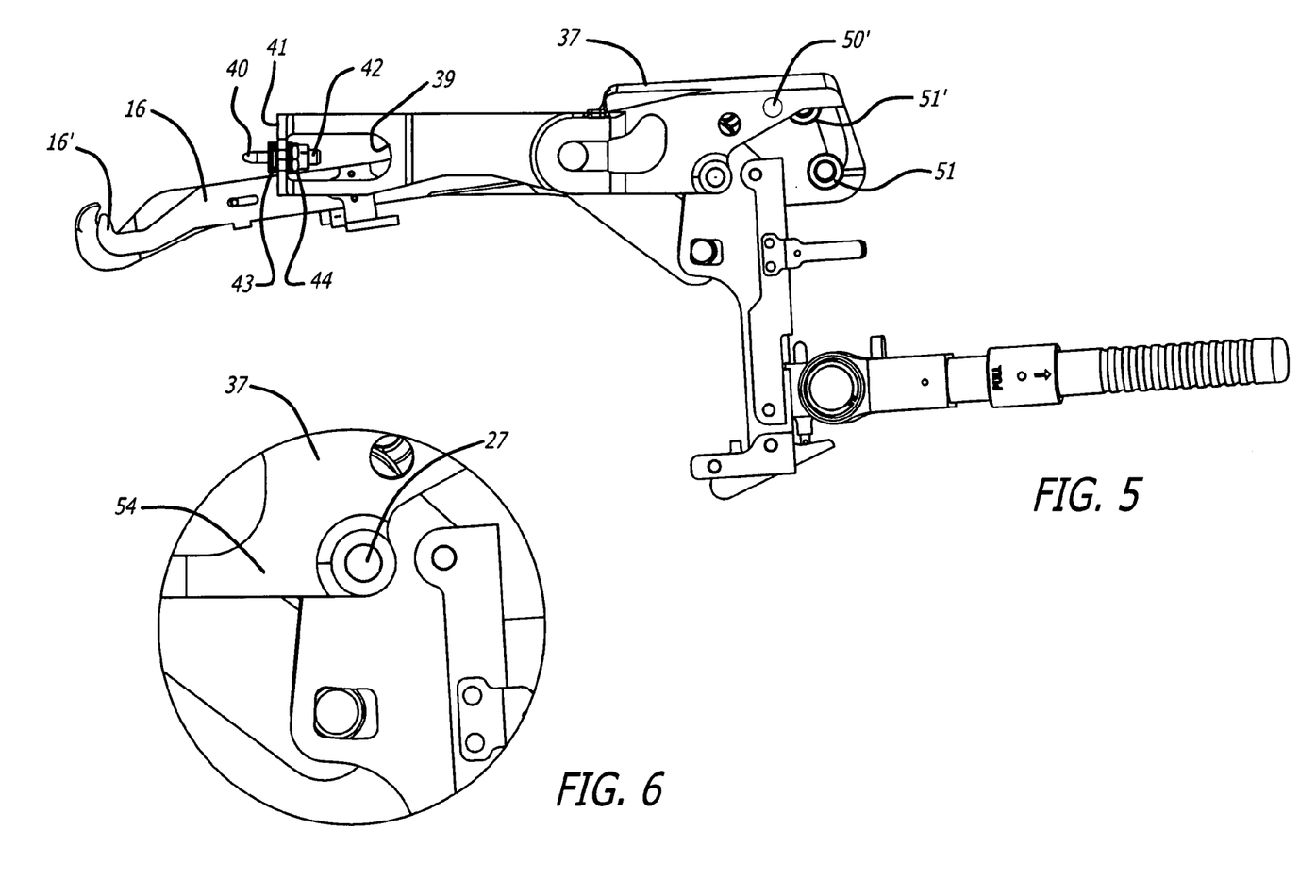
FIG. 5 shows the latch of FIG. 4 in the fully open position.
FIG. 6 is a detailed view of a portion of FIG. 5 illustrating the detent feature thereof.

It can thus be seen that the trigger 91 cannot be moved or knocked accidentally to release the same until handle portion 102 is released. Detent 27 (FIG. 6) engages housing assembly 37 and allows the latch 10 to stay in the open locked position (FIG. 5).

It can thus be seen that the trigger safety feature 76 underneath the trigger 91 keeps the trigger 91 locked to prevent trigger 91 from being hit. The secondary locking feature prevents the trigger 91 from being released.

The handle portion 102 must be moved back to the FIG. 2 position to shut the latch 10. The spring biased detent 131 (FIG. 5) enters detent plug hole 52 in housing 37 and allows the latch to stay in the open locked position. This keeps the hook 13 down out of the way. The cowl (not shown) of the aircraft in which the latch is mounted cannot be closed until the spring braced detent 131 is overridden.

It can be seen that the trigger safety feature provided by sliding pin 76 blocks the trigger 91 from opening during service. By blocking trigger 91 from opening, it forces the latch to be opened in the proper sequence. The trigger 91 is mounted at the end of the handle portion 115 where it could easily be activated by accident.

The trunion plate 25 eliminates the need for a main mounting bolt as in prior art mounts. Rather than mounting the latch through the hook, as in prior art applications, the link assembly 25 connects to housing 37 with bosses 27 protruding on either side thereof. This bridging of the links adds rigidity and also cradles the hook 13 and prevents it from falling down when not engaged with the keeper pin 40. Bolts (not shown) are used to secure the latch 10 to the housing 37 using holes in the housing 37 as is well known in the art.

The springs 89, 95 eliminate problems and wear in vibration conditions. These springs are located where spring force is required, close to trigger 91. This puts adequate force at the trigger without overstressing the springs.

The detent handle retainer, provided by spring biased detent 131, and its engagement in the hole through boss 53 in housing 37, hold the handle in the fully open position and is thus an essential safety feature of the latching system of the invention. This feature causes the handle portion 102 to interfere with the cowl doors of the aircraft, preventing the doors from being closed inadvertently while the latch is still unlatched.

The hook sensor 16 is shown in hook sensing position in FIG. 5. It is normally biased to this position when the hook assembly is released to this position. Thus, the engagement with a latch pin can be sensed when in this position.

Although a particular embodiment of the invention is disclosed, variations thereof may occur to an artisan and the scope of the invention should only be limited by the scope of the appended claims.

What is claimed is:

1. An aircraft latch having a slotted housing mounted thereon comprising:
   a) a hook assembly having a main body portion terminating at one end in a hook adapted to engage a trigger assembly having a latching pin and a trigger-locking pin remote from said hook;
   b) a trunion plate pivotally mounted on said body portion engaging said housing, said trigger assembly having a spring-biased trigger pivotally mounted thereon having notches therein for engaging said trigger-locking pin, said trigger movable from a first position out of engagement with said trigger-locking pin to a second position in engagement with said trigger-locking pin, said trigger assembly having a spring-biased trigger-release pin normally disposed in a position away from engagement with said trigger; and
   c) a pivotable handle having a first end pivotally secured to a handle portion integral with said trigger assembly having a spring-biased locking sleeve mounted thereon normally locking said handle in a first position extending normal to the longitudinal axis of said trigger assembly and said sleeve, which, when released from its spring-bias, enables said handle to move to a second position generally parallel to the longitudinal axis of said trigger assembly, said handle having an abutment flange thereon engaging said spring-biased trigger release pin holding the same against said trigger when said handle is in the second position.

2. The latch of claim 1 including a spring-biased hook sensor mounted on said hook assembly normally biased to a position having a hook sensor disposed in said hook for sensing the engagement of a latching pin therein.

3. The latch of claim 1 including a spring-biased detent mounted in said trigger assembly adapted to engage an opening in said housing and retain said latch in its fully open position with respect to said housing.

4. The latch of claim 1 wherein said trunion plate has a pair of protruding bosses on opposite sides thereof for engaging slots in said slotted housing.

5. The latch of claim 1 wherein a spring-biased cover plate is pivotally mounted in said trigger assembly above said trigger release pin, said trunion plate abutting against said cover plate when said trigger is locked to said trigger-locking pin to hold the same in a non-vibrating condition.

6. The latch of claim 1 wherein said trigger release pin is mounted in an opening through said handle portion.

7. An aircraft latch comprising:
   a) a housing;
   b) a hook assembly having a main body portion terminating at one end in a hook adapted to engage a trigger assembly on said housing, and a trigger-locking pin on said housing remote from said hook;
   c) a trunion plate pivotally mounted on said main body portion, said trigger assembly having a spring-biased trigger pivotally mounted thereon having notches therein for engaging said trigger-locking pin, said trigger movable from a first position out of engagement with said trigger-locking pin to a second position in engagement with said trigger-locking pin, said trigger assembly having a spring-biased trigger-release pin normally disposed in a position away from engagement with said trigger; and
   d) a pivotable handle having a first end pivotally secured to a handle portion integral with said trigger assembly having a spring-biased locking sleeve mounted thereon normally locking said handle in a first position extending normal to the longitudinal axis of said trigger assembly and said sleeve, which, when released from its spring-bias, enables said handle to move to a second position generally parallel to the longitudinal axis of said trigger assembly, said handle having an abutment flange thereon engaging said spring-biased trigger release pin holding the same against said trigger when said handle is in the second position.

8. The latch of claim 7 including a spring-biased hook sensor mounted on said hook assembly normally biased to a position having a hook sensor disposed in said hook.

9. The latch of claim 7 including a spring-biased detent mounted in said trigger assembly.

10. The latch of claim 7 wherein said trunion plate has a pair of protruding bosses on opposite sides thereof.

11. The latch of claim 7 wherein a spring-biased cover plate is pivotally mounted in said trigger assembly above said trigger release pin, said trunion plate abutting against said cover plate when said trigger is locked to said trigger-locking pin to hold the same in a non-vibrating condition.

12. The latch of claim 7 wherein said trigger release pin is mounted in an opening through said handle portion.

13. An aircraft latch assembly comprising:
   a) a housing having a slotted opening therein;
   b) a hook assembly having a main body portion terminating at one end in a hook adapted to engage a trigger assembly mounted in said housing having a latching pin and a trigger-locking pin remote from said hook;
   c) a trunion plate pivotally mounted on said main body portion engaging said housing, said trigger assembly having a spring-biased trigger pivotally mounted thereon having notches therein for engaging said trigger-locking pin, said trigger movable from a first position out of engagement with said trigger-locking pin to a second position in engagement with said trigger-locking pin, said trigger assembly having a spring-biased trigger-release pin normally disposed in a position away from engagement with said trigger; and d) a pivotable handle having a first end pivotably secured to a handle portion integral with said trigger assembly having a spring-biased locking sleeve mounted thereon normally locking said handle in a first position extending normal to the longitudinal axis of said trigger assembly and said sleeve, which, when released from its spring-bias, enables said handle to move to a second position generally parallel to the longitudinal axis of said trigger assembly, said handle having an abutment flange thereon engaging said spring-biased trigger release pin holding the same against said trigger when said handle is in the second position.

14. The latch of claim 13 including a spring-biased hook sensor mounted on said hook assembly normally biased to a position having a hook sensor disposed in said hook for sensing the engagement of a latching pin therein.

15. The latch of claim 13 including a spring-biased detent mounted in said trigger assembly engaging an opening in said housing and retaining said latch in its fully open position with respect to said housing.

16. The latch of claim 13 wherein said trunion plate has a pair of protruding bosses on opposite sides thereof engaging slots in said slotted housing.

17. The latch of claim 13 wherein a spring-biased cover plate is pivotally mounted in said trigger assembly above said trigger release pin, said trunion plate abutting against said cover plate when said trigger is locked to said trigger-locking pin to hold the same in a non-vibrating condition.

18. The latch of claim 13 wherein said trigger release pin is mounted in an opening through said handle portion.

* * * * *